Patented June 27, 1939

2,163,984

UNITED STATES PATENT OFFICE 2,163,984

PROCESS FOR THE PREPARATION OF A RUST-PREVENTING COATING ON METALLIC OBJECTS

Valentin Anton Petkovic, Berlin, Germany

No Drawing. Application December 7, 1936, Serial No. 114,639. In Germany December 9, 1935

19 Claims. (Cl. 91—68)

There are plenty of rust preventive agents, but none of them has been adopted generally, particularly because they are either too expensive for large and very huge objects or not suited at all for hardly movable and cumbersome objects. This is specially true for the known preservant procedures using soluble phosphates and phosphoric acid, with which a digestion of the object in a fluid or the application of a boiling fluid is necessary.

Heretofore attempts have been made to obtain a durable phosphate coat in the cold, by mixing casein to the phosphates as a binding agent and treating the coating with milk of lime or with a solution of calcium chloride, to render it weatherproof by the formation of insoluble caseinates. This procedure has the disadvantage that important quantities of a substance, which is expensive and also an essential food, are needed and that furthermore a considerable part of the phosphoric acid is transformed in compounds ineffective against rusting.

This invention relates to a process for the preparation of a rust preventing coating containing phosphoric acid and phosphates, which process is applicable in an economic manner to the most cumbersome objects. The invention is based on the known phenomenon, that solutions of glue or of related gelatinous substances such as isinglass, dextrin and so on by the admixture of chromates or bichromates get the property to form when exposed to the light, coatings or varnishes turning waterproof. But the use of such a solution containing chromated glue is checked particularly with large and difficultly movable objects by the fact that it is hardly avoidable not to expose the coating to light when applying it and that the transformation of the glue into chromated glue decreases considerably its binding power. According to the invention the rust preventing substances consisting of phosphoric acid and phosphates are completely or partly dissolved or suspended in a solution of animal glue or in a like gelatinous liquid and furthermore a solution of chromic acid, chromates or bichromates is separately prepared, said solution containing if convenient also a part of the necessary phosphoric acid or any other materials to be introduced into the coat. The two solutions are applied simultaneously and are united when applied to the object. The solutions are applied by spraying under pressure and the two solutions may be sprayed simultaneously from two converging nozzles on the object to be protected in order that an intimate mixture takes place on said object. The first solution for instance may consist of a solution of commercial animal glue to which the desired quantity of soluble phosphates is added. Furthermore there may be admixed to the glue solution thickening means such as drying oils, linoxyn, montan wax, ceresine, rubber latex separately or in mixture, whereby also the resistivity against water and weather is raised. These thickening means may be added to the glue solution in the form of emulsions. The second solution may consist for instance of a solution of an alkali chromate or bichromate, to which is added so much of phosphoric acid, that a small excess of free phosphoric acid is formed besides the alkaline phosphate and also some free chromic acid. Thereby the chromic acid in combination with the phosphates exhibits the special property that the rust preventing efficiency is materially improved, since chromic acid and the chromates are good rust preventing agents. Preferably to the second solution still some more free chromic acid than needed for the production of the chromated glue may be added. The two solutions cold or hot are sprayed by a known spraying apparatus under pressure from two separate tanks on the object. To either of the two solutions or to both solutions substances may be added which increase the rust preventing effect or produce a protection against growth of lower animals or plants such as antifouling agents e. g. phenols, cresols, salicylic acid, poisons for plants or animals like a solution of arsenious or of arsenic acid in phosphoric acid; also colours, preferably poisonous pigments such as lead arsenite, copper compounds and the like may be added. Such additional substances may be applied separately under pressure dissolved or in suspension by atomizing same simultaneously with or subsequently after the two solutions performing the rust prevention proper.

Some illustrative examples are given herewith:

Example I

Solution A:

10–15 parts by weight of commercial glue,
    1–2 parts by weight of phosphoric acid,
    0.5–1 part by weight of arsenic trioxide and
    Unto 100 parts by weight of water.

Solution B:

1.5–2 parts by weight of alkali bichromate,
    2–3 parts by weight of phosphoric acid and
    Unto 100 parts by weight of water.

Example II

Solution A:
- 10–15 parts by weight of glue,
- 2–3 parts by weight of phosphoric acid,
- 0.5–1 part by weight of arsenic trioxide,
- 1–3 parts by weight of linoxyn and
- Unto 100 parts by weight of water.

Solution B:
- 1.5–3 parts by weight of alkali bichromate,
- 2–5 parts by weight of phosphoric acid and
- Unto 100 parts by weight of water.

Example III

Solution A:
- 10–15 parts by weight of glue,
- 5 parts by weight of rubber latex,
- 2–3 parts by weight of phosphoric acid,
- 1–5 parts by weight of trisodium phosphate,
- 0.5–1 part by weight of arsenic trioxide and
- Unto 100 parts by weight of water.

Solution B:
- 1.5–3 parts by weight of alkali bichromate,
- 2–3 parts by weight of phosphoric acid and
- Unto 100 parts by weight of water.

The trisodium phosphate may be added to solution B and be omitted in solution A.

Having now particularly described and ascertained the nature of my said invention, I declare that what I claim is:

1. The herein described method of preparing a rust preventing coating on metallic objects which consists in simultaneously applying two separate solutions to the object to be treated, one of said solutions comprising phosphoric acid and animal glue, the other of said solutions comprising substantially a chrome-oxygen-compound.

2. The herein described method of preparing a rust preventing coating on metallic objects which consists in simultaneously spraying under pressure two different solutions to the object to be treated, one of said solutions including phosphoric acid and phosphates suspended in a solution of animal glue, permitting adherence of said phosphoric acid and phosphates on said object, the other of said solutions comprising substantially chromic acid, increasing the degree of rust preventing efficiency and the imperviousness of said coating.

3. The herein described method of preparing a rust preventing coating on metallic objects which consists in simultaneously spraying under pressure two different solutions to the object to be treated, one of said solutions comprising phosphoric acid and phosphates, at least partly dissolved in a solution of animal glue, permitting adherence of said phosphoric acid and phosphates on said object, the other of said solutions comprising substantially alkali chromate, the latter in combination with said solution of glue increasing the imperviousness of said coating, if the same is exposed to light.

4. A method, according to claim 1, in which said other of said solutions contains an excess of free chromic acid.

5. A method, according to claim 1, in which said other of said solutions contains free phosphoric acid.

6. A method, according to claim 1, wherein other of said solutions contains phosphoric acid in such a quantity that after the reaction of said solutions there is still present some free phosphoric acid.

7. A method, according to claim 1, in which at least either solution contains soluble phosphates.

8. A method, according to claim 1, in which the other of said solutions contains soluble phosphates and an excess of free phosphoric acid.

9. A method, according to claim 1, in which at least either solution contains additions of disinfecting agents.

10. A method, according to claim 1, in which at least either solution contains additions of poisons for plants or animals.

11. A method, according to claim 1, in which at least either solution contains arsenic compounds.

12. A method, according to claim 1, in which at least either solution contains compounds of copper and arsenic.

13. A method, according to claim 1, in which to the one of said solutions besides glue also organic thickening means are added.

14. A method, according to claim 1, in which the one of said solutions contains drying oils emulsified in the glue solution.

15. A method, according to claim 1, in which the one of said solutions contains waxes.

16. A method, according to claim 1, in which the one of said solutions contains rubber latex.

17. A method, according to claim 1, in which the one of said solutions contains pigments.

18. A method, according to claim 1, in which the one of said solutions contains poisonous pigments.

19. A method, according to claim 1, in which the one of said solutions contains lead arsenite.

VALENTIN ANTON PETKOVIC.